United States Patent
Naik et al.

(10) Patent No.: US 9,015,076 B1
(45) Date of Patent: Apr. 21, 2015

(54) METHODS FOR INTEGRATING WORKFORCE INFORMATION

(71) Applicant: FMR LLC, Boston, MA (US)

(72) Inventors: Uday Naik, Westford, MA (US);
Siddhartha Seksaria, Nashua, NH (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/333,133

(22) Filed: Jul. 16, 2014

(51) Int. Cl.
*G06F 21/00* (2013.01)
*G06Q 20/12* (2012.01)
*G06F 17/30* (2006.01)

(52) U.S. Cl.
CPC ...... *G06Q 20/1235* (2013.01); *G06F 17/30946* (2013.01)

(58) Field of Classification Search
USPC ............................................. 705/50
See application file for complete search history.

(56) References Cited

U.S. PATENT DOCUMENTS

2003/0018510 A1\* 1/2003 Sanches ............................ 705/9
2007/0208577 A1\* 9/2007 Leon et al. ........................ 705/1

\* cited by examiner

*Primary Examiner* — Zeshan Qayyum
(74) *Attorney, Agent, or Firm* — Proskauer Rose LLP

(57) ABSTRACT

A computerized-method of integrating workforce information data across multiple business units is provided. Workforce information for each business unit is parsed into discrete sized data blocks. There are multiple steps to processing each data block, and the steps are executed sequentially on each data block and in parallel with processing of other data blocks.

13 Claims, 6 Drawing Sheets

METHODS FOR INTEGRATING WORKFORCE INFORMATION

FIELD OF THE INVENTION

The invention relates generally to computer-based methods for integrating workforce information. More specifically, the invention relates to computer-based methods of integrating workforce information over multiple clock cycles for workforce information from multiple business units.

BACKGROUND

In a diversified organization with many business units having a mix of cloud-based, home-grown and/or vendor solutions, application generation of workforce information is quite often an inefficient and non-standard process. Each business unit having its own solution can make it difficult to standardize an organization's workforce information and/or apply business rules to the workforce information in an efficient and timely manner. For example, there is typically redundancy of information, inconsistent data definitions, data inaccuracy, minimal data re-use, limited transparency into business rules and/or data sourced from non-authoritative sources.

Various methods exists to standardize workforce information across multiple business units. One such exemplary method involves applying one or more business rules to workforce information by having each business unit invoke the business rules via a web service. There are difficulties associated with this exemplary method. For example, it can be necessary that application servers for each of the business unit be operational at the same time that the business rules are to be applied to the workforce information. This can be undesirable because the workforce information is typically not mastered and/or scattered across the enterprise and/or various cloud systems. Other difficulties associated with the method include 1) the process of sending the workforce information via the web service, applying the rules on the web service server side, and transmitting the information back can cause unwanted latency; 2) transmitting un-encrypted workforce data between servers can create a security risk; and 3) poor performance by failing to meet service level agreements (e.g., execution of rules for large datasets can exceed 30 minutes for ~38,850 employees with 77,780 business rules where a lesser amount of time is the agreement).

Another exemplary method involves storing the workforce information in an XML file and configuring one or more business rules into an executable jar file that executes on the XML file. Some of the difficulties with this method are as follows: 1) an entire XML file has to be generated prior to applying the rules, which can cause all other aspects of the method to have to wait until the file is generated prior to processing resulting in delay; 2) the XML file is not encrypted causing a potential security breach; and 3) scaling to a larger data set degrades performance. For example, as the number of records increases, the file size increases. For a serial approach, as the file size increases, because the resources are largely engaged in parsing the increased file size, unused resources are idling.

Another approach involves using Java and embedding the rules within Java to act as a bridge between a workforce information database and a rules engine. Some of the difficulties with this method include a failure to allow for a reset capability and a slow read and write.

Therefore, it is desirable to receive workforce information from multiple varied business units and apply one or more business rules to the workforce information with an efficient, secure, and uniform method.

SUMMARY OF THE INVENTION

Advantages of the claimed invention include applying business rules to data from one or more business units in a diversified organization in a uniform, efficient, secure manner. Advantages of the invention also include an increase in performance. For example, for a workforce data set having business rules applied according the invention, an approximate load of up to fifty times the average realizable load is achievable.

Advantages of the invention also include improved data lineage and/or an improved metadata glossary and definitions. Advantages of the invention also include improved security due to the workforce data being non-persisted in an un-encrypted format as it is processed. Advantages of the invention also include minimal dependent on external systems to be available to process the workforce information and/or minimal network latency due to elimination of the need to transmit the workforce information over the internet while processing.

In one aspect, the invention involves a computerized-method of integrating workforce information data received from a plurality of business units. The computerized-method involves during a first clock cycle, retrieving, by a computing device, a first data block of predetermined workforce information from a workforce information data repository, the workforce information repository including workforce information data received from the plurality of business units, the size of the data block is based on an attribute of the particular business unit of the plurality of business units that the workforce information being retrieved was received from. The computerized-method also involves during a second clock cycle, a) retrieving, by the computing device, a second data block of predetermined workforce information from the workforce information data repository and b) applying, by the computing device, one or more rules to the first data block of predetermined workforce information to create a first consuming application ready data block, the one or more rules are based on requirements of a consuming application that receives the consuming application ready data block. The computerized-method also involves during a third clock cycle, a) retrieving, by the computing device, a third data block of predetermined workforce information from the workforce information data repository, and b) applying, by the computing device, one or more rules to the second data block of predetermined workforce information to create a second consuming application ready data block, and c) transmitting, by the computing device, the first consuming application ready data block to the consuming application.

In some embodiments, the computerized-method involves during a fourth clock cycle, a) retrieving, by the computing device, a fourth data block of predetermined workforce information from the workforce information data repository, and b) applying, by the computing device, one or more rules to the third data block of predetermined workforce information to create a second consuming application ready data block, and c) transmitting, by the computing device, the second consuming application ready data block to the consuming application.

In some embodiments, the computerized-method involves during a fifth clock cycle, a) retrieving, by the computing device, a fifth data block of predetermined workforce information from the workforce information data repository, and b) applying, by the computing device, one or more rules to the fourth data block of predetermined workforce information to create a second consuming application ready data block, and c) transmitting, by the computing device, the third consuming application ready data block to the consuming application.

In some embodiments, the computerized-method involves decrypting, by the computing device, the first data block of predetermined workforce information. In some embodiments, computerized-method involves encrypting, by the computing device, the first consuming application ready data block.

In some embodiments, the computerized-method involves determining, by the computing device, whether the first data block of predetermined workforce information is in an Extensible Markup Language format and transforming, by the computing device, the first data block of predetermined workforce information into an Extensible Markup Language format if the first data block of predetermined workforce information is not in an Extensible Markup Language format.

In some embodiments, the first consuming application ready data block is output as a string. In some embodiments, applying the one or more rules further comprises retrieving, by the computing device, the one or more rules based on the attribute of the particular business unit of the plurality of business units. In some embodiments, the computerized-method involves transmitting, by the computing device, the first consuming application ready data block to a data repository.

In some embodiments, the one or more rules are integration rules, precedence rules, derived rules, or any combination thereof. In some embodiments, the first clock cycle, the second clock cycle and the third clock cycle are substantially equal. In some embodiments, the first clock cycle is approximately 0.5 seconds. In some embodiments, in the first data block size varies based on a parameter as specified in the workforce information.

In another aspect, the invention involves a computer program product, tangibly embodied in a computer readable storage medium, for integrating workforce information data received from a plurality of business units. The computer program product including instructions operable to cause a data processing apparatus to during a first clock cycle, retrieve a first data block of predetermined workforce information from a workforce information data repository, the workforce information repository including workforce information data received from the plurality of business units, the size of the data block is based on an attribute of the particular business unit of the plurality of business units that the workforce information being retrieved was received from. The instructions are also operable to cause a data processing apparatus to during a second clock cycle, a) retrieve a second data block of predetermined workforce information from the workforce information data repository and b) apply one or more rules to the first data block of predetermined workforce information to create a first consuming application ready data block, the one or more rules are based on requirements of a consuming application that receives the consuming application ready data block. The instructions are also operable to cause a data processing apparatus to during a third clock cycle, a) retrieve a third data block of predetermined workforce information from the workforce information data repository, and b) apply one or more rules to the second data block of predetermined workforce information to create a second consuming application ready data block, and c) transmit the first consuming application ready data block to the consuming application.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

Generally, a method of integrating workforce information data across multiple business units, where many of the business units do not share operating systems, is provided. Workforce information for each business unit is parsed into discrete sized data blocks. There are multiple steps to processing each data block, and the steps are executed sequentially on each data block and in parallel with processing of other data blocks.

Each data block is retrieved, has business rules applied to it and is transmitted to a consuming application. Each of these steps is executed sequentially for each data block. Each data block is operated on in parallel. For example, assume the workforce information was parsed into four data blocks. During a first time duration (e.g., first clock cycle), the first data block is retrieve. During the second clock cycle (e.g., a second clock cycle), the first data block has business rules applied to it and a second data block is retrieved. During a third clock cycle (e.g., a third clock cycle), the first data block is transmitted to a consuming application, the second data block has business rules applied to it, and a third data block is retrieved. During a fourth clock cycle (e.g., a fourth clock cycle), the second data block is transmitted to a consuming application, the third data block has business rules applied to it, and a fourth data block is retrieved. This process continues, until all of the data blocks are processed.

Figure 1:
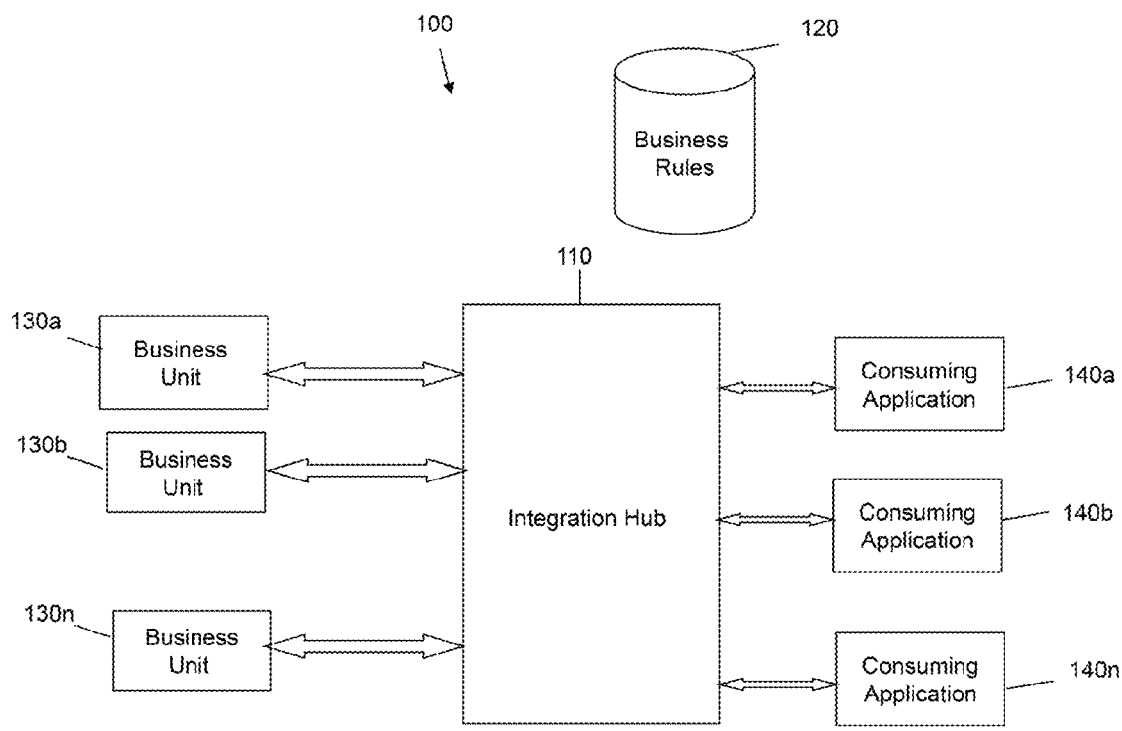
FIG. 1 is a block diagram showing a computing system for integrating workforce information, according to an illustrative embodiment of the invention.

FIG. 1 is a block diagram showing an exemplary integration system 100 for integrating workforce information data received from a plurality of business units, according to an illustrative embodiment of the invention. The components shown here, their connections and relationships, and their functions, are meant to be exemplary only, and are not meant to limit implementations of integration method described and/or claimed in this document.

The integration system 100 includes an integration hub server 110, a business rules database 120, a plurality of business unit computing devices 130a, 130b, . . . , 130n, generally, 130, a plurality of consuming applications, 140a, 140b, . . . , 140n, and a business rules database 120. Computing devices 130, consuming applications 140, integration hub 110 and business rules 120 are intended to represent various forms of digital computers, such as laptops, desktops, workstations, personal digital assistants, servers, blade servers, mainframes, and other appropriate computers.

In other implementations, multiple processors and/or multiple busses can be used, as appropriate, along with multiple memories and types of memory. Multiple computing devices can be connected, with each device providing portions of the necessary operations (e.g., as a server bank, a group of blade servers, or a multi-processor system).

The integration system 110 can integrate workforce information from multiple business units within an organization. Each business unit computing device 130, 132, transmits workforce data to the integration hub 110. The integration hub 110 parses the workforce data into a group of data blocks having a predetermined size. The integration hub 110 retrieves each data block once from the group of data blocks, determines one or more business rules from the business rules database 120 that applies to each data block, applies the determined one or more business rules to each corresponding data block, and transmits each data block to one or more consuming applications 140. The integration hub 110 executes the steps on each data block sequentially, and in parallel for all data blocks.

Figure 2:
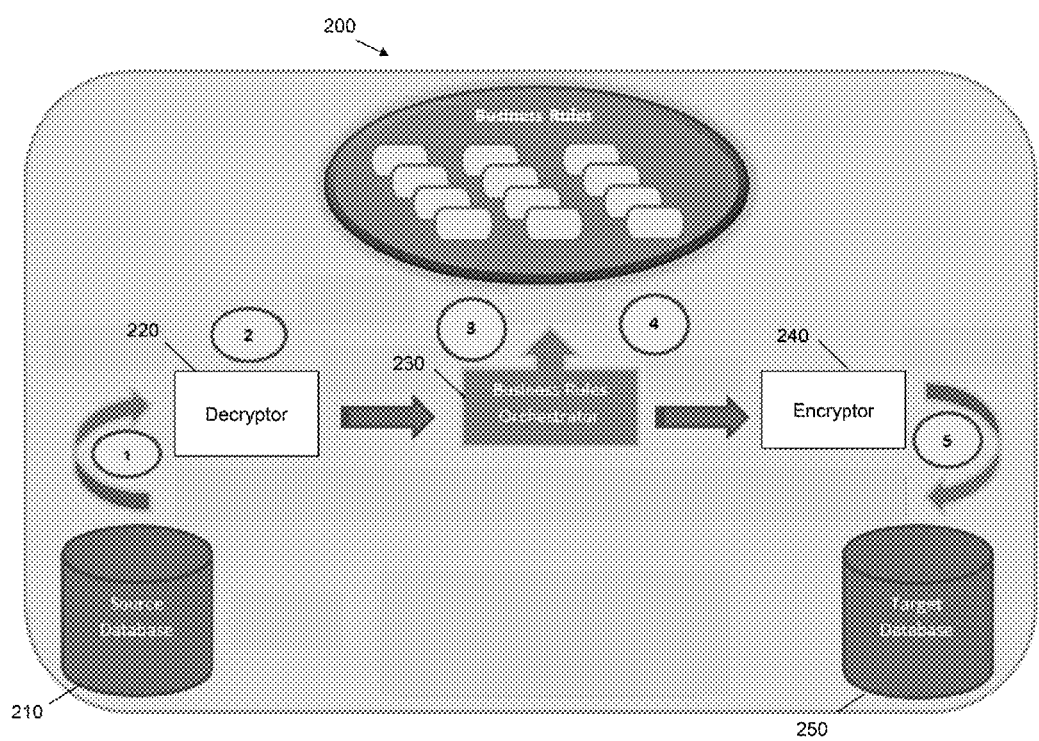
FIG. 2 is a block diagram showing a method for integrating workforce information, according to an illustrative embodiment of the invention.

FIG. 2 is a block diagram a showing an exemplary flow of data through a workforce information integration system 200 (e.g., integration system 100 as shown above in FIG. 1), according to an illustrative embodiment of the invention. The workforce information integration system 200 includes a source database 210, a data decryptor 215, a business rules orchestrator 220, a data encryptor 225, and a target database 230.

The source database 210 is in communication with one or more business unit computing devices (not shown) and the data decryptor 215. The data decryptor 215 is in communication with the source database 210 and the business rules orchestrator 220. The business rules orchestrator 220 is in communication with the data decryptor 215 and the data encryptor 225. The data encryptor 225 is in communication with the target database 230.

In operation, the source database 210 receives encrypted workforce information from the one or more business unit computing devices. The source database 210 parses the encrypted workforce information into discrete data blocks. The size of each data block depends on a parameter that is received with the encrypted workforce information. Each data block is assigned a business unit identifier. The business identifier indicates which of the one or more business unit computing devices the encrypted workforce information was received from. In some embodiments, if the encrypted workforce information is not in Extensible Markup Language, the workforce information is transformed into Extensible Markup Language.

Each data block is retrieved from the source database 210 and decrypted via the data decryptor 215. In some embodiments, each data block is stored as Extensible Markup Language format. In some embodiments, each data block is stored as a field in a data base table. In some embodiments, the data decryptor 215 is AES256 bit encryption. In these embodiments, a key is typically necessary for decryption.

Each data block is sequentially retrieved from the source database 210 based upon an expiration of a time duration. For example, during after a first clock cycle passes, a first data block is retrieved and transmitted to the data decryptor 215. After a second clock cycle passes, a second data block is retrieved and transmitted to the data decryptor 215. The time duration can be based on a block size, xml content, processing speed, or any combination thereof.

After being decrypted, each data block is transmitted to the business rules orchestrator 220. The business rules orchestrator 220 determines which business rule/rules from a plurality of business rules to apply to each data block.

In some embodiments, the applicable business rules depend on the business unit identifier assigned to the data block. In some embodiments, the applicable business rules depends on how different data blocks are integrated with each other, business criteria for standardization, and/or data block content. Each data block is sequentially processed by the business rules orchestrator 220. Continuing with the example given above, after the second clock cycle passes, the first data block is transmitted to the business rules orchestrator 220. After a third clock cycle passes, the second data block is transmitted to the business rules orchestrator 220.

In various embodiments, the business rules are integration rules, precedence rules, derived rules, or any combination thereof. In some embodiments, integration rules include rules to integrate employee information from multiple global workforce systems. In some embodiments, precedence rules include specifying a rule that has a higher precedence if the employee exists in two or more systems. In some embodiments, derived rules include computing a complete address from various address attributes from each workforce systems. Is some embodiments, calculation rules include computing total compensation based on various compensation metrics from various systems e.g. salary from a human resource system, bonuses from a compensation system and/or shares from shares system.

The business rules orchestrator 220 transmits each data block to the data encryptor 225. In some embodiments, the data encryptor 225 is AES256 bit encryption. The data encryptor 225 encrypts each of the data blocks. Each data block is sequentially encrypted. Continuing with the example given above, after the third clock cycle passes, the first data block is encrypted. After a fourth clock cycle passes, the second data block is encrypted.

The data encryptor 225 transmits each data block to the target database 230. The target database 230 stores each of the data blocks. The target database 230 receives each of the data blocks sequentially. Continuing with the example given above, after the fourth clock cycle passes, the first data block is stored in the target database 230. After a fifth clock cycle passes, the second data block is stored in the target database 230.

In some embodiments, each data block is stored in the target database 230 as a string. In some embodiments, the data encryptor 225 transmits each data block directly to a consuming application.

In some embodiments, the first clock cycle, the second clock cycle, the third clock cycle, the fourth clock cycle and the fifth clock cycle are substantially equal. In some embodiments, the first clock cycle, the second clock cycle, the third clock cycle, the fourth clock cycle and the fifth clock cycle can depend on the size of the data block. In some embodiments, the first clock cycle, the second clock cycle, the third clock cycle, the fourth clock cycle and the fifth clock cycle as the data block size decreases, the clock cycle decreases. In some embodiments, the first clock cycle, the second clock cycle, the third clock cycle, the fourth clock cycle and the fifth clock cycle as the data block size increases, the clock cycle increases. In various embodiments, the first clock cycle, the second clock cycle, the third clock cycle, the fourth clock cycle and/or the fifth clock cycle are 0.5 seconds.

Figure 3:
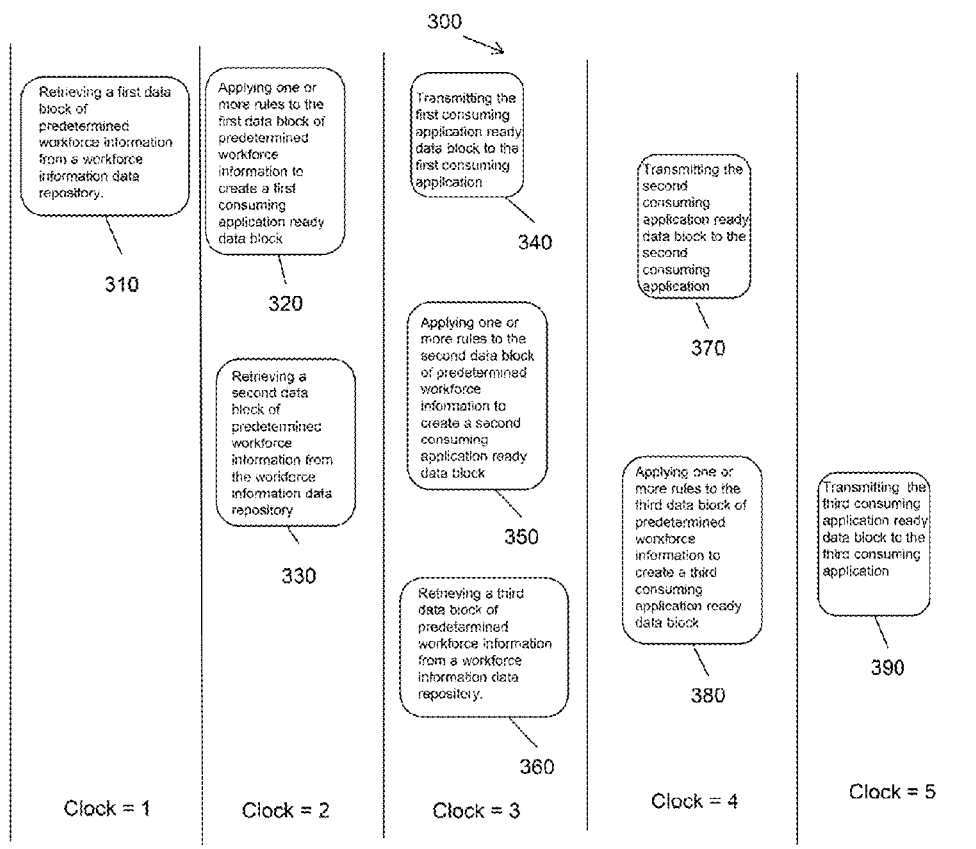
FIG. 3 is a timing diagram showing a method for integrating workforce information, according to an illustrative embodiment of the invention.

FIG. 3 is a timing diagram showing a method 300 for integrating workforce information, according to an illustrative embodiment of the invention. The method involves, during a first clock cycle, retrieving a first data block of predetermined workforce information from a workforce information data repository (e.g., source database 210, as shown above in FIG. 2) (Step 310).

The method also involves, during a second clock cycle, applying one or more rules to the first data block of predetermined workforce information to create a first consuming application ready data block (step 320) and retrieving a second data block of predetermined workforce information from the workforce information data repository (step 330).

The method also involves, during a third clock cycle, transmitting the first consuming application ready data block to the first consuming application (step 340), applying one or more rules to the second data block of predetermined workforce information to create a second consuming application ready data block (step 350) and retrieving a third data block of predetermined workforce information from a workforce information data repository (step 360).

The method also involves, during a fourth clock cycle, transmitting the second consuming application ready data block to the second consuming application (step 370) and applying one or more rules to the third data block of predetermined workforce information to create a third consuming application ready data block (step 380).

The method also involves, during a fifth clock cycle, transmitting the third consuming application ready data block to the third consuming application (step 390).

It is apparent to one of ordinary skill in the art that any number of data blocks can be sequentially processed in parallel, and that the use of first, second, third, etc. is for exemplary purposes only.

Figure 4:
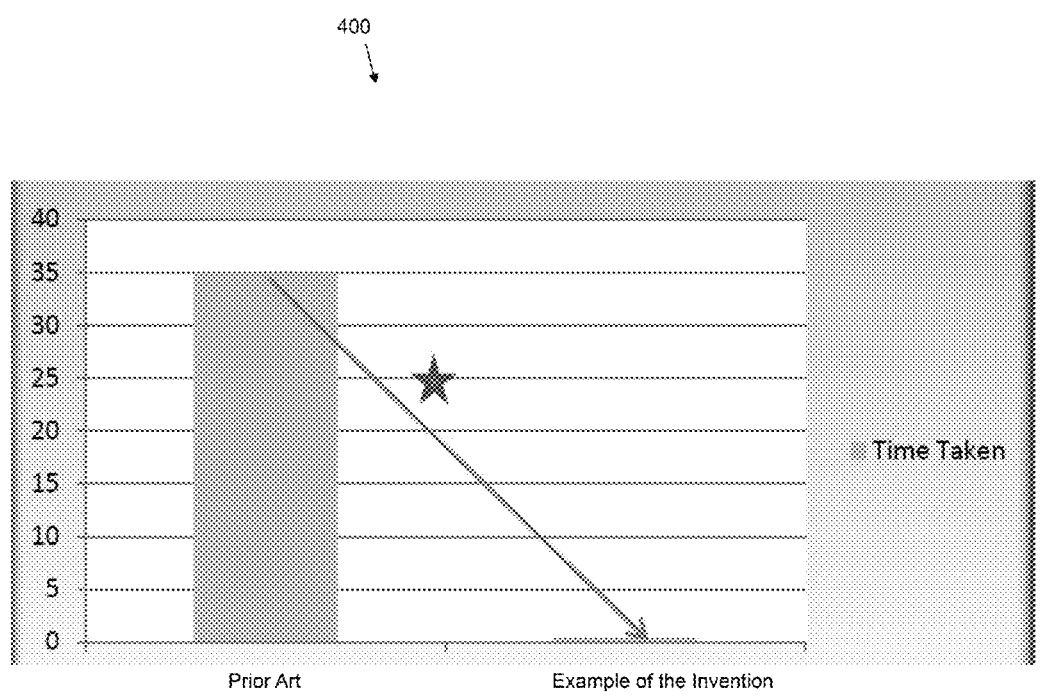
FIG. 4 is a graph showing time to apply business rules for a prior art method of applying business rules and applying business rules according to an illustrative embodiment of the invention.

FIG. 4 is a graph 400 showing time to apply business rules for a prior art method of applying business rules and applying business rules according to an illustrative embodiment of the invention. For the same size of workforce information, the amount of time to apply business rules to the workforce information is drastically reduced by applying business rules according to an illustrative embodiment of the invention (e.g. the method as described above in FIG. 3).

Figure 5:
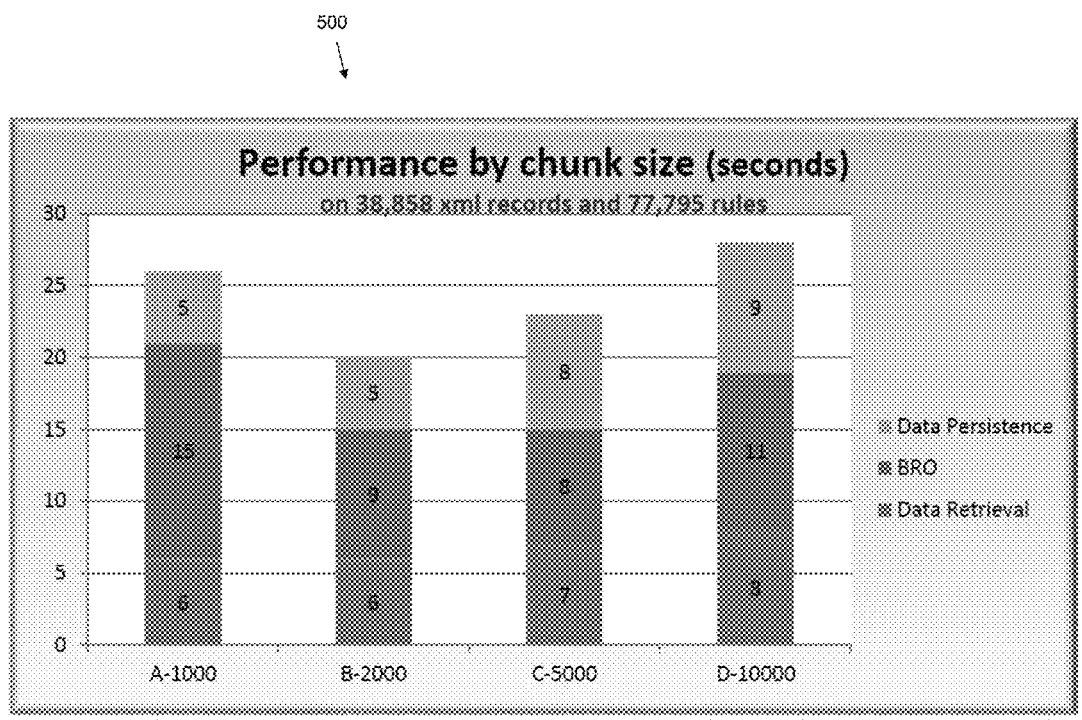
FIG. 5 is a graph showing time to apply business rules as a function of data block size, according illustrative embodiments of the invention.

FIG. 5 is a graph 500 showing time to apply business rules as a function of data block size, according illustrative embodiments of the invention. As the size of the workforce information data block increases, the duration it takes to apply business rules to the workforce information data does not significantly increase. For example, for a data block of 1000 XML records having 77,795 business rules applied, the amount of time to apply the business rules is approximately 26 seconds. For a data block of 10000 XML records having the same number of business rules applied (77,795), the amount of time to apply the business rules is approximately 28 seconds.

Figure 6:
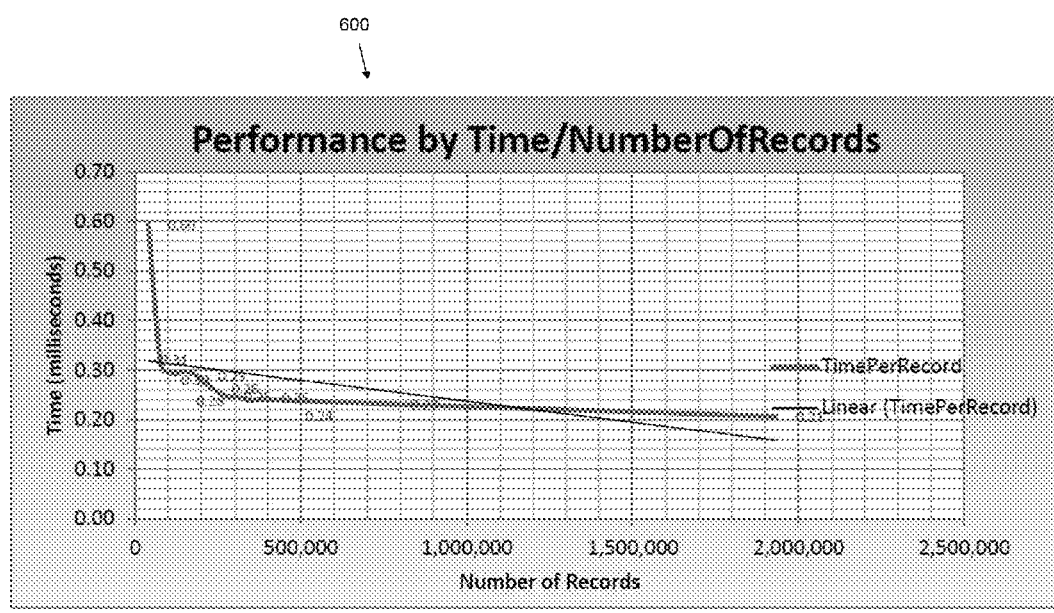
FIG. 6 is a graph showing time to process each data block as a function of number of data blocks, according to illustrative embodiments of the invention.

FIG. 6 is a graph 600 showing time to process each data block as a function of number of data blocks, according to illustrative embodiments of the invention. As the number of data blocks increases, the amount of time to apply business rules increases less and less. For example, for 1,000,000 data blocks, the time it takes to apply business rules to the data blocks is approximately 0.23 milliseconds. For 1,500,000 data blocks, the time is takes to apply business rules to the data blocks is approximately 0.22 milliseconds.

The above-described systems and methods can be implemented in digital electronic circuitry, in computer hardware, firmware, and/or software. The implementation can be as a computer program product (e.g., a computer program tangibly embodied in an information carrier). The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example, semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, or tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized-method of integrating workforce information data received from a plurality of business units, the method comprising:
   receiving, by a computing device, encrypted workforce information and parameters from each of a plurality of business units;
   storing, by the computing device, the encrypted workforce information in a workforce information data repository;
   during a first clock cycle, a) retrieving, by the computing device, a first parameter of a particular business unit of the plurality of business units, b) determining, by the computing device, a first identifier and a first size of a first data block based on the retrieved first parameter and c) retrieving a decrypting, by the computing device, the first data block of the first size from the workforce information data repository;
   during a second clock cycle, a) retrieving, by the computing device, a second parameter of a particular business unit of the plurality of business units, b) determining, by the computing device, a second identifier and a second size of a second data block based on the retrieved second parameter c) retrieving and decrypting, by the computing device, the second data block of the second size from the workforce information data repository and d) determining, by the computing device, a first set of one or more rules based on the first identifier of the first data block and requirements of a first consuming application and e) creating, by the computing device, a first consuming application ready data block by applying the first set of one or more rules to the first data block; and
   during a third clock cycle, a) retrieving, by the computing device, a third parameter of a particular business unit of the plurality of business units, b) determining, by the computing device, a third identifier and a third size of a third data block based on the retrieved third parameter c) retrieving and decrypting, by the computing device, the third data block of the third size from the workforce information data repository, and, d) determining, by the computing device, a second set of one or more rules based on the second identifier and requirements of a second consuming application, and e) creating, by the computing device, a second consuming application ready data block, by applying the second set of one or more rules to the second data block, and f) transmitting, by the computing device, the first consuming application ready data block to the first consuming application.

2. The computerized-method of claim 1 further comprising:
   during a fourth clock cycle, a) retrieving, by the computing device, a fourth parameter of a particular business unit of the plurality of business units, b) determining, by the computing device, a fourth identifier and a fourth size of a fourth data block based on the retrieved fourth parameter, c) retrieving and decrypting, by the computing device, the fourth data block of the fourth size from the workforce information data repository, d) determining, by the computing device, a third set of one or more rules based on the third identifier and requirements of a third consuming application, e) creating, by the computing device, the third consuming application ready data block by applying the third set of one or more rules to the third data block, and f) transmitting, by the computing device, the second consuming application ready data block to the second consuming application.

3. The computerized-method of claim 2 further comprising:
during a fifth clock cycle, a) retrieving, by the computing device, a fifth parameter of a particular business unit of the plurality of business units, b) determining, by the computing device, a fifth identifier and a fifth size of a fifth data block based on the retrieved fifth parameter c) retrieving and decrypting, by the computing device, the fifth data block of the fifth size from the workforce information data repository, d) determining, by the computing device, a fourth set of one or more rules based on the fourth identifier and requirements of a fourth consuming application, e) creating, by the computing device, the fourth consuming application ready data block by applying the fourth set of one or more rules to the fourth data block, and f) transmitting, by the computing device, the third consuming application ready data block to the third consuming application.

4. The computerized-method of claim 1 further comprising encrypting, by the computing device, the first consuming application ready data block.

5. The computerized-method of claim 1 further comprising:
determining, by the computing device, whether the first data block of predetermined workforce information is in an Extensible Markup Language format; and
transforming, by the computing device, the first data block of predetermined workforce information into an Extensible Markup Language format if the first data block of predetermined workforce information is not in an Extensible Markup Language format.

6. The computerized-method of claim 5 wherein the first consuming application ready data block is output as a string.

7. The computerized-method of claim 1 wherein applying the one or more rules further comprises retrieving, by the computing device, the one or more rules based on an attribute of the particular business unit of the plurality of business units.

8. The computerized-method of claim 1 further comprising transmitting, by the computing device, the first consuming application ready data block to a data repository.

9. The computerized-method of claim 1 wherein the one or more rules are integration rules, precedence rules, derived rules, or any combination thereof.

10. The computerized-method of claim 1 wherein the first clock cycle, the second clock cycle and the third clock cycle are substantially equal.

11. The computerized method of claim 10 wherein the first clock cycle is approximately 0.5 seconds.

12. The computerized-method of claim 1 wherein the first data block size varies based on a configurable parameter.

13. A computer program product, tangibly embodied in a non-transitory computer readable storage medium, for integrating workforce information data received from a plurality of business units, the computer program product including instructions when executed by a computing device, cause the computing device to perform the steps of:
receiving, encrypted workforce information and parameters from each of a plurality of business units;
storing, the encrypted workforce information in a workforce information data repository;
during a first clock cycle, a) retrieving, a first parameter of a particular business unit of the plurality of business units, b) determining, first identifier and a first size of a first data block based on the retrieved first parameter, and c) retrieving and decrypting, the first data block of the first size from the workforce information data repository;
during a second clock cycle, a) retrieving, a second parameter of a particular business unit of the plurality of business units, b) determining, a second identifier and a second size of a second data block based on the retrieved second parameter c) retrieving and decrypting, the second data block of the second size from the workforce information data repository and d) determining, a first set of one or more rules based on the first identifier of the first data block and requirements of a first consuming application and e) creating, a first consuming application ready data block by applying the first set of one or more rules to the first data block; and
during a third clock cycle, a) retrieving, a third parameter of a particular business unit of the plurality of business units, b) determining, a third identifier and a third size of a third data block based on the retrieved third parameter, c) retrieving and decrypting, the third data block of the third size from the workforce information data repository, and, d) determining, a second set of one or more rules based on the second identifier and requirements of a second consuming application, and e) creating the second consuming application ready data block, by applying the second set of one or more rules to the second data block, and f) transmitting, the first consuming application ready data block to the first consuming application.

* * * * *

UNITED STATES PATENT AND TRADEMARK OFFICE
CERTIFICATE OF CORRECTION

| | | |
|---|---|---|
| PATENT NO. | : 9,015,076 B1 | Page 1 of 1 |
| APPLICATION NO. | : 14/333133 | |
| DATED | : April 21, 2015 | |
| INVENTOR(S) | : Uday Naik and Siddhartha Seksaria | |

It is certified that error appears in the above-identified patent and that said Letters Patent is hereby corrected as shown below:

In the claims

In column 12, line 23, Claim 13

Delete – "determining, first identifier"

and replace it with

– "determining, a first identifier"

Signed and Sealed this
First Day of December, 2015

Michelle K. Lee
*Director of the United States Patent and Trademark Office*